(12) United States Patent
Skog et al.

(10) Patent No.: US 11,770,430 B2
(45) Date of Patent: *Sep. 26, 2023

(54) METHODS AND APPARATUS FOR DELIVERING CONTENT

(71) Applicant: TELEFONAKTIEBOLAGET LM ERICSSON (PUBL), Stockholm (SE)

(72) Inventors: Robert Skog, Hässelby (SE); Chris McEvilly, Bagshot (GB)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/715,913

(22) Filed: Apr. 7, 2022

(65) Prior Publication Data

US 2022/0232056 A1    Jul. 21, 2022

Related U.S. Application Data

(62) Division of application No. 16/956,464, filed as application No. PCT/EP2017/084047 on Dec. 21, 2017, now Pat. No. 11,323,498.

(51) Int. Cl.
*H04L 65/612* (2022.01)
*H04L 65/80* (2022.01)
*H04L 67/568* (2022.01)

(52) U.S. Cl.
CPC ........... *H04L 65/612* (2022.05); *H04L 65/80* (2013.01); *H04L 67/568* (2022.05)

(58) Field of Classification Search
None
See application file for complete search history.

(56) References Cited

U.S. PATENT DOCUMENTS

| | | |
|---|---|---|
| 2014/0280746 A1 | 9/2014 | Johns |
| 2015/0207846 A1 | 7/2015 | Famaey |
| 2015/0373079 A1 | 12/2015 | Seedorf et al. |
| 2016/0337680 A1 | 11/2016 | Kalagi et al. |
| 2016/0381169 A1 | 12/2016 | Van der Merwe et al. |
| 2017/0171287 A1 | 6/2017 | Famaey |

*Primary Examiner* — Scott B Christensen (57) ABSTRACT

Methods and apparatus are provided for processing communications. In one aspect, a method in a first node in a network of delivering content comprises delivering a first portion of the content to a device, receiving a request for a second portion of the content from the device and, responsive to the request and responsive to a determination that the second portion of the content should be delivered to the device from a second node in the network, instructing the device to retrieve the content from the second node.

20 Claims, 6 Drawing Sheets

METHODS AND APPARATUS FOR DELIVERING CONTENT

RELATED APPLICATIONS

This application is a division of U.S. application Ser. No. 16/956,464, filed Jun. 19, 2020, which is a 371 of International Application No. PCT/EP2017/084047, filed Dec. 21, 2017, the disclosures of which are fully incorporated herein by reference.

TECHNICAL FIELD

Examples of the present disclosure relate to methods and apparatus, for example for delivering content, such as Adaptive Bit Rate (ABR) media content, to a device.

BACKGROUND

A content delivery network or content distribution network (CDN) is a large distributed system of proxy servers deployed in multiple data centers via the Internet. The goal of a CDN is to serve content to end-users with high availability and high performance. CDNs serve a large fraction of Internet content, including web objects (text, graphics and scripts), downloadable objects (media files, software, and documents), applications (e-commerce, portals), live streaming media, on-demand streaming media and social networks.

Requests for content from a device may be directed to a node in a CDN that is optimal in some way. For example, a node that is best for serving content to the device may be chosen. This may be determined, for example, by choosing a node that has the fewest network hops to the device, the shortest latency to the device, or the highest availability. When optimizing for cost, locations that are least expensive may be chosen instead.

Adaptive bitrate streaming is a technique used in streaming some media content over communication networks. While earlier streaming systems used protocols such as RTP with RTSP, later adaptive streaming technologies are usually based on HTTP and designed to work efficiently over large distributed HTTP networks such as the Internet.

SUMMARY

One aspect of the present disclosure provides a method in a first node in a network of delivering content. The method comprises delivering a first portion of the content to a device and receiving a request for a second portion of the content from the device. The method also comprises, responsive to the request and responsive to a determination that the second portion of the content should be delivered to the device from a second node in the network, instructing the device to retrieve the content from the second node.

Another aspect of the present disclosure provides apparatus for delivering content. The apparatus comprises a processor and a memory. The memory contains instructions executable by the processor such that the apparatus is operable to deliver a first portion of the content to a device, receive a request for a second portion of the content from the device and, responsive to the request and responsive to a determination that the second portion of the content should be delivered to the device from a second node in the network, instruct the device to retrieve the content from the second node.

A further aspect of the present disclosure provides apparatus for delivering content. The apparatus comprises a delivering module configured to deliver a first portion of the content to a device and a receiving module configured to receive a request for a second portion of the content from the device. The apparatus also comprises an instructing module configured to instruct the device to retrieve the content from the second node in response to the request and in response to a determination that the second portion of the content should be delivered to the device from a second node in the network.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

The current method for determining a Content Delivery Network (CDN) and/or a node in a CDN to serve content to a device determines a CDN and/or node at session start. For example, a device may retrieve a manifest file associated with content a user of the device wishes to consume (for example, the content may be a video that the user wishes to watch). The manifest file identifies data associated with the content (e.g. one or more segments containing video data). The manifest may identify a Uniform Resource Locator (URL) or Fully Qualified Domain Name (FQDN). The device may request data (e.g. a first segment) by requesting DNS resolution of the URL or FQDN. The DNS resolution operation may be completed at least in part by network, such as a network to which the device is connected. The DNS resolution operation may return an IP address of a server or node, referred to as a Request Router (RR). The device then requests the data (e.g. first segment) from the server or node at the IP address, i.e. the RR. The RR redirects the device to the IP address of a cache node, which may be selected based on any of the criteria identified above, using a HTTP Redirect instruction. The device then retrieves the data (e.g. segment) from the cache node, and any further data (e.g. additional segments) from the cache node.

This method of operation is designed for fixed networks and a stationary device, as apart from service failure the network paths between the cache node and the device may not change significantly. However, events such as a network congestion, movement of the device or a change in connection status of the device (e.g. the device moving from a mobile network to a Wi-Fi network) may result in the node delivering content to the device no longer being the optimal delivery node. For example, data rate, latency and/or other properties of a connection between the node and the device may degrade.

Figure 1A:
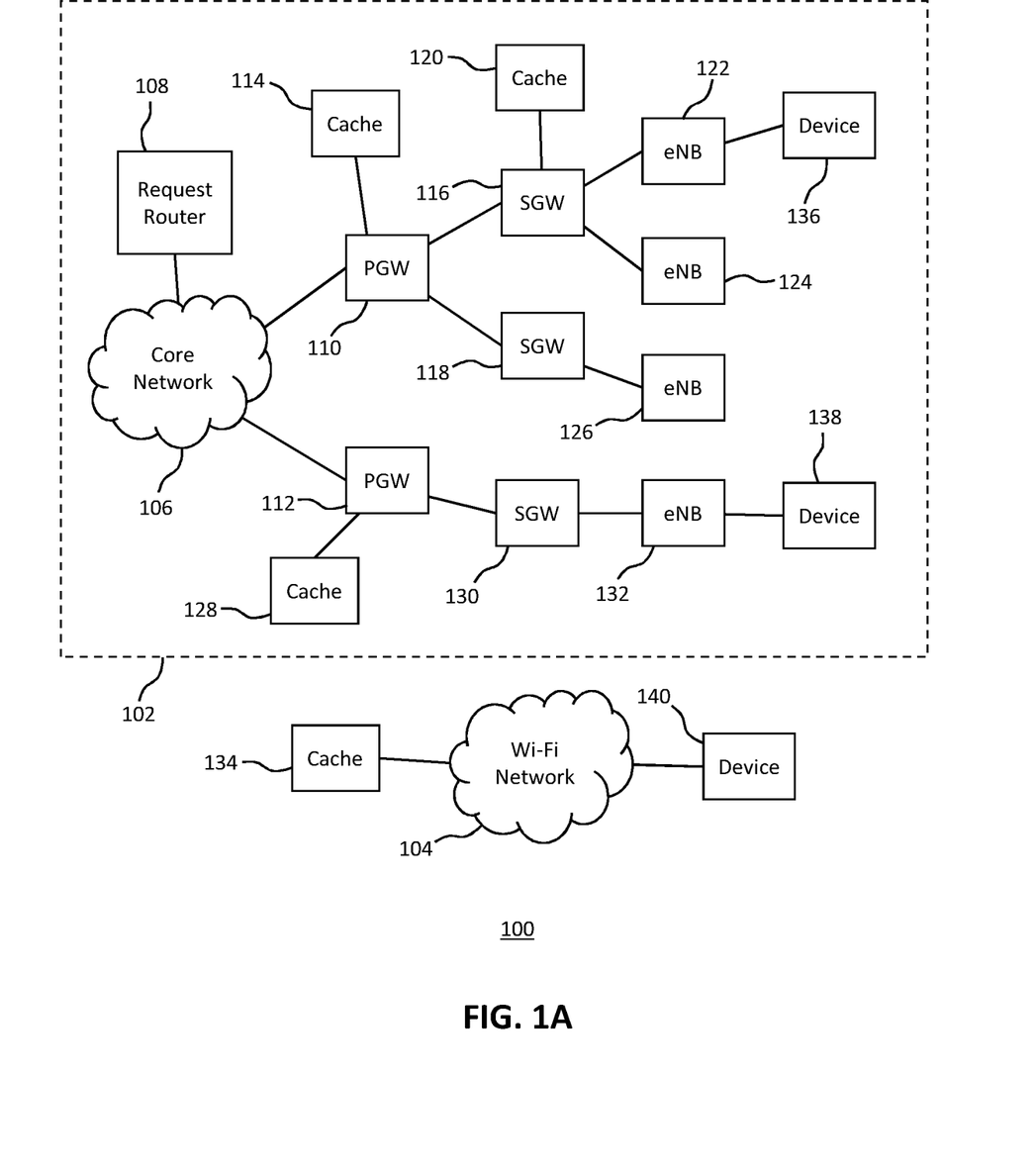
FIG. 1A is a schematic illustration of an example of a communications system.

FIG. 1A shows an example of a communications system 100. The system 100 includes a mobile network 102 and a Wi-Fi network 104. The mobile network 102 includes a core network 106 that is connected to a Request Router (RR) 108 and Packet Gateways (PGW) 110 and 112. PGW 110 is connected to a cache node 114 and Serving Gateways (SGW) 116 and 118. SGW 116 is connected to cache node 120 and eNodeBs (eNB) 122 and 124. The mobile network 102 shown is merely an illustrative example, and in other examples there may be fewer or more PGWs, each connected to one or more SGWs, each SGW being connected to one or more eNBs. In other examples, the mobile network 102 may use different technologies or nodes or may be a different type of network.

SGW 118 is connected to eNB 126. PGW 112 is connected to cache node 128 and SGW 130. SGW 130 is connected to eNB 132. The Wi-Fi network 104 is connected to cache 134, in some examples via another network such as the Internet. In other examples, the Wi-Fi network may instead be a different type of network or use different technology.

System 100 shows a device 136 connected to eNB 136. In this scenario, the RR 108 may redirect the device 136 to retrieve data associated with content (e.g. segments of content) from cache 120 connected to SGW 116. The cache 120 may have the fewest hops to the device 136, may be geographically closest to the device 136, or may be selected based on any other criteria.

In an example scenario, the device 136 moves to a position within the mobile network 102 shown by device 138. When the device is in this position, it still requests content from the same cache node 120, even though it may no longer be the optimal cache node. For example, cache node 128 may be more suitable, as for example it may have fewer hops to the device at position 138, or may be geo-graphically closer. Therefore, by requesting content from cache node 120, the content must be delivered over more hops, which may degrade the experience of the user of the device, and may also contribute to congestion within the network 102.

The device may also connect to Wi-Fi network 104, as shown by the device in position 140. In this case, requests for data associated with content may be made through the Wi-Fi network 104, but again the requests are made to the cache node 120, which may not be the optimal cache node.

Figure 1B:
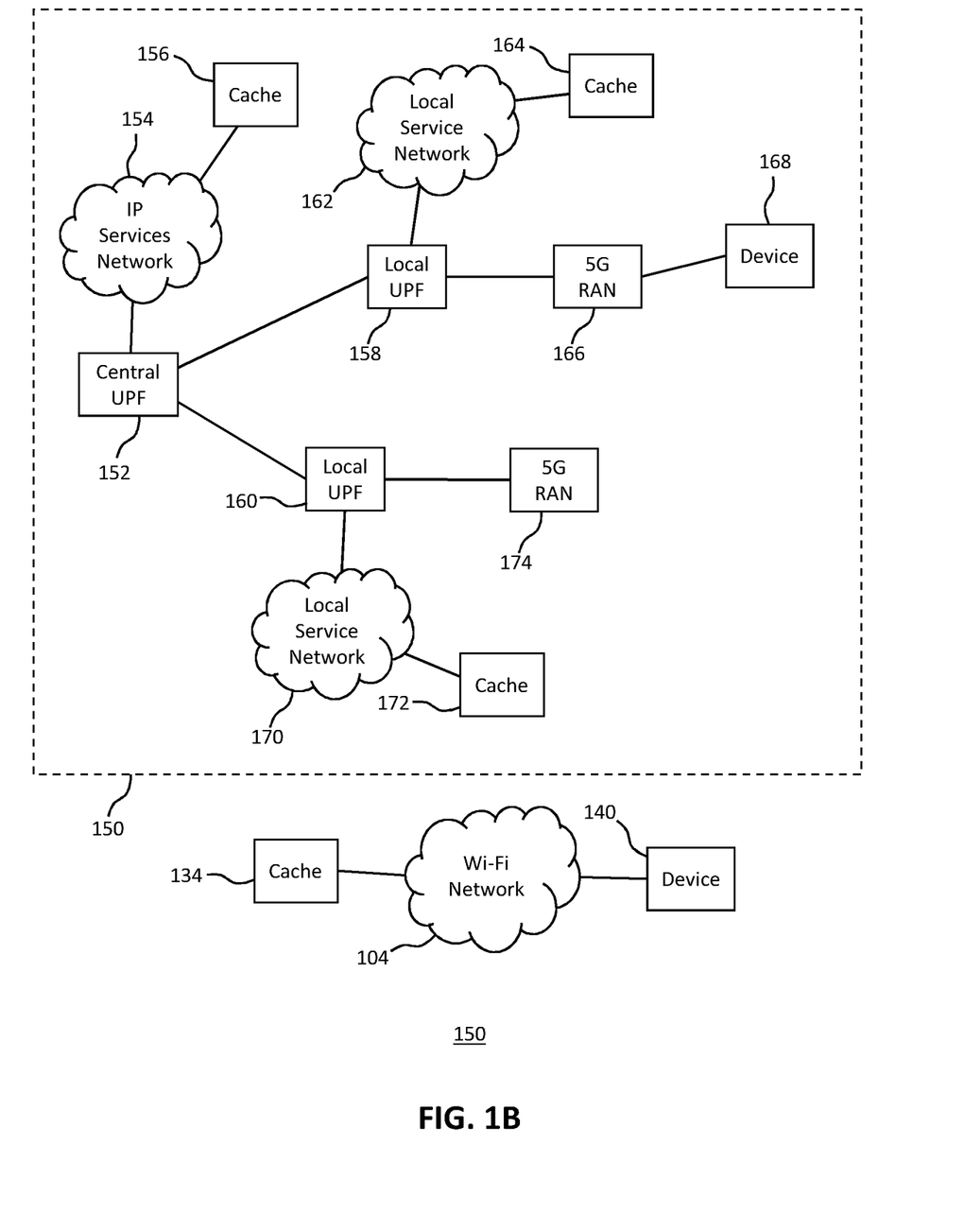
FIG. 1B is a schematic illustration of another example of a communications system.

FIG. 1B shows an example of a communications system 150. The system 150 includes a 5G mobile network 152 and a Wi-Fi network 104. The mobile network 150 includes a central User Plane Function (UPF) 152 connected to an IP Services Network 154. A cache node 156 is connected to the IP Services Network 154. The central UPF 152 is also connected to a plurality of local UPFs 158 and 160 (two local UPFs are shown in this example). Local UPF 158 is connected to a Local Service Network 162, which is connected to or incorporates a cache node 164. Local UPF 158 is also connected to at least one 5G Radio Access Network (RAN) 166 (e.g. eNB, gNB). A device 168 is connected to the mobile network 150 via 5G RAN 166. The Local Services Network 162 and/or cache nodes connected thereto (e.g. cache node 164) may in some examples serve content to devices connected to 5G RANs connected to local UPF 158, such as 5G RAN 166 for example.

Local UPF 160 is connected to another Local Services Network 170, which is connected to or incorporates cache node 172. Local UPF 160 is also connected to at least one 5G RAN (e.g. eNB, gNB) 174. The Local Services Network 170 and/or cache nodes connected thereto (e.g. cache node 172) may in some examples serve content to devices connected to 5G RANs connected to local UPF 160, such as 5G RAN 174 for example. The 5G mobile network 152 may also include other components and nodes (not shown).

The communications system 150 also shows a device in position 140, a Wi-Fi network 104 and cache node 134 connected to Wi-Fi network 104, similar to FIG. 1A. The device 168 may roam between 5G RANs (e.g. 5G RANs 166 and 174) in the mobile network 150, and/or may become connected to or disconnected from Wi-Fi network 104.

Embodiments disclosed herein may be implemented within any suitable communications system or network, such as those shown in FIG. 1A or 1B or any other type of communications system or network.

Figure 2:
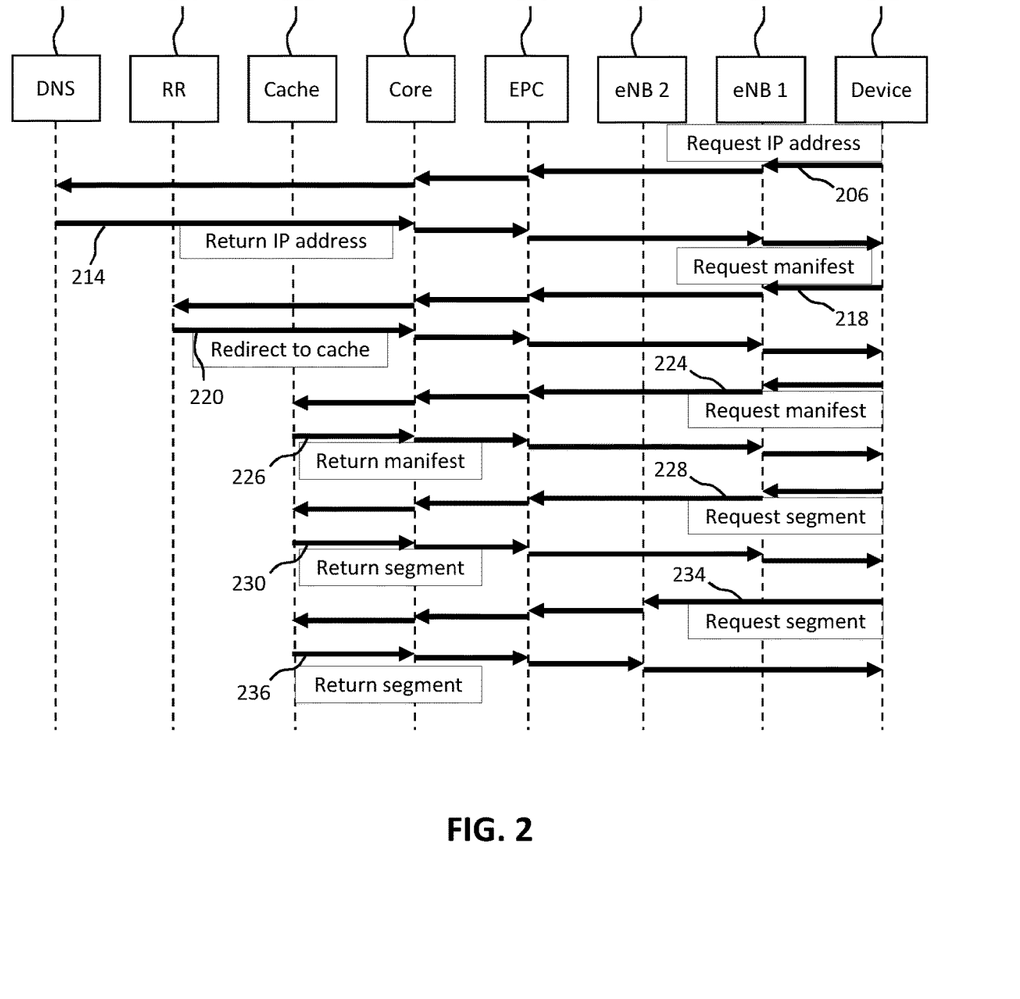
FIG. 2 is a schematic illustration of an example of communications in a communications system.

FIG. 2 shows an example of communications in a communications system, which may be for example the communications system 100 of FIG. 1A, although other examples may be implemented in another communications system such as for example the communications system 150 of FIG. 1B. A device 202 (which may for example be the device 136 shown in FIG. 1A) is connected to a first eNB 204 (e.g. eNB 122 in FIG. 1A). The device 202 wishes to access content. For example, a user of the device selects a URL that is a link to a manifest file associated with that content. The device 202 requests DNS resolution of the URL or Fully Qualified Domain Name (FQDN) by sending a request 206 to the eNB 204. The request is routed, repeated or otherwise propagated through Evolved Packet Core (EPC) 208 (e.g. SGW and/or PGW) to the core network 210, and then to a DNS server 212. The DNS server 212 sends a reply 214 to the device 202 via the core network 210, EPC 208 and first eNB 204. The reply 214 identifies an IP address of request router 214.

The device 202 then sends a request 218 for a manifest to the IP address, i.e. to the Request Router 216, via the first eNB 204, EPC 208 and core network 210. The Request Router replies with a redirection instruction 220 redirecting the device 202 to a cache server/node 222. The cache node 222 may be selected based one or more criteria, such as for example the criteria identified above. The redirection Instruction may reply for example with a URL of the server/node 222 and the device 202 may perform a DNS resolution or lookup operation on this URL to determine its IP address.

The device 202 then requests the manifest from the cache server with request 224, which is propagated via first eNB 204, EPC 208 and core network 210. The cache server returns the manifest 226. The device 202 then requests a first segment of content from the cache node 222 with a request 228 via the first eNB 204, EPC 208 and core network 210, using the DNS response 214 previously obtained from the DNS server 212 to resolve the hostname, URL or FQDN of the segment into the IP address of the cache node 222. The cache node 222 returns the segment 230 via the core network 210, EPC 208 and first eNB 204. The device 202 may request one or more further segments in this manner.

At this point, in the example shown, the device 202 moves within the network so that it becomes connected to (e.g. is handed over to) second eNB 232. The device 202 continues to request segments from the same cache node 222. For example, the device 202 sends a request 234 for a segment, the request 234 being transmitted via second eNB 232, EPC 208 and core network 210. The segment 236 is returned by the cache node 222 to the device 202 via core network 210, EPC 208 and second eNB 232. However, the cache node 222 may no longer be the ideal or desired cache node for the device 202 when connected to the second eNB 232. This may be similar in other mobile access technologies, for example in a 5G network where a device is handed over from one gNB to another gNB. The UPF serving the device may change, for example between local UPFs or to/from a central UPF, or the device may become connected to or disconnected from a Wi-Fi network, for example. The preferred cache node for the device may therefore change.

Figure 3:
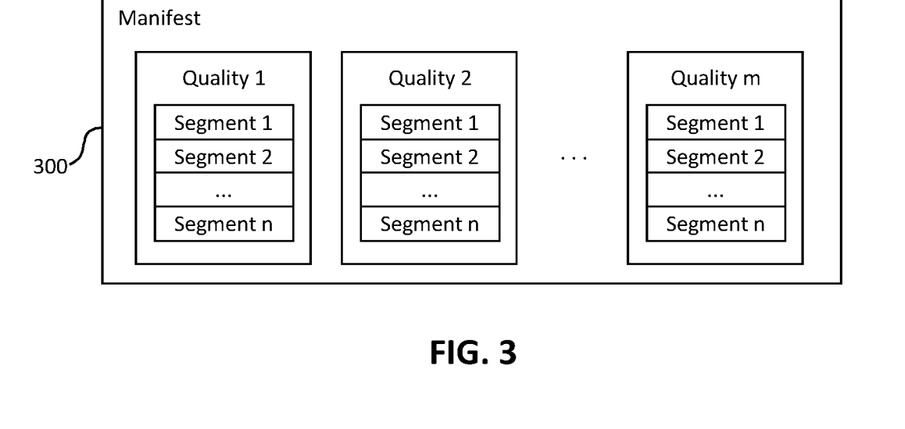
FIG. 3 is a schematic illustration of an example of a manifest associated with content.

FIG. 3 shows an example of a manifest 300 associated with Adaptive Bit Rate (ABR) content. Data associated with the content (e.g. a video) is split into n segments, for example segments of equal length, such as 10 seconds. Each segment is represented by m data files having respective quality levels. Data associated with the content therefore comprises n*m data files. The manifest 300 identifies locations in a network, such as filenames or URLs, where each of the segments can be retrieved. For example, the manifest 300 identifies n data files having a first quality, n data files having a second quality, and so on. A segment of content at different quality levels may have different file sizes. Therefore, for example, where bandwidth between a cache node and a device is large, the device may request larger segments and thus provide the content (e.g. display a video) at a high quality. Conversely, where the bandwidth is lower, the device may request smaller segments for lower quality content. By separating each quality level into segments, the device may select a quality level on the fly with regard to changing network conditions and bandwidth, and may seamlessly provide adjacent segments of different quality levels to the user with little or no interruption.

Some embodiments disclosed herein recognise that a device requesting content may move within a network or between networks, and therefore updates the node from which the device requests content.

Figure 4:
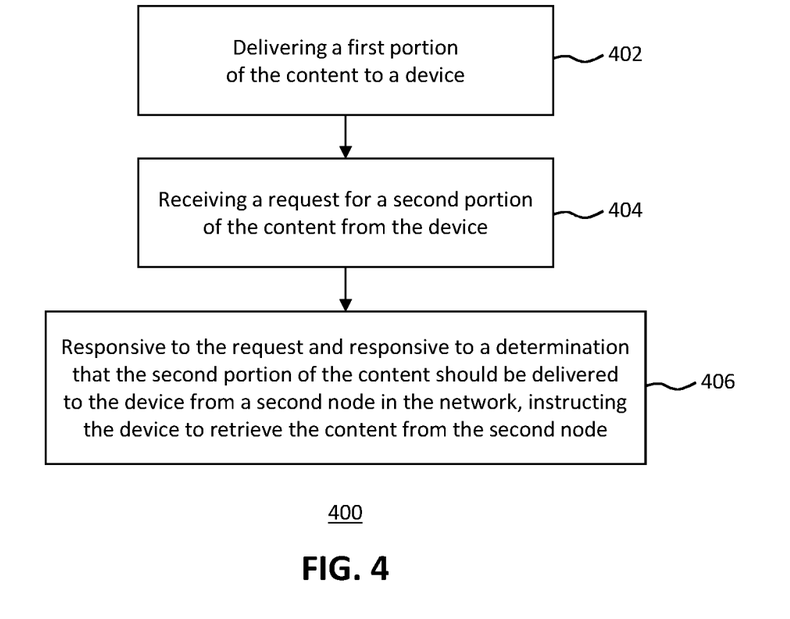
FIG. 4 is a flow chart of an example of a method of delivering content.

FIG. 4 shows an example of a method 400 a first node in a network of delivering content. The method 400 may be carried out, for example, by a cache node. The method comprises, in step 402, delivering a first portion of the content to a device. The first portion may be for example a segment of content, for example ABR content. The first portion may be delivered to the device in response to a request from the device for the first portion. The request may comprise, for example, a HTTP GET request sent from the device to the IP address of the first node. The IP address may in some examples have been previously obtained by the device using a DNS resolution process when requesting some other data, for example another portion of the content or a manifest associated with the content.

Step 404 of the method 400 comprises receiving a request for a second portion of the content from the device, such as for example a second segment of content. In examples where the content comprises a plurality of quality levels, such as Adaptive Bit Rate (ABR) content, the quality of the first portion may be the same as or different to the quality of the second portion. Step 406 comprises, responsive to the request and responsive to a determination that the second portion of the content should be delivered to the device from a second node in the network, instructing the device to retrieve the content from the second node. That is, for example, the device is redirected to the second node such that the device retrieves the content from the second node.

In some examples, the determination that the second portion of the content should be delivered to the device from the second node comprises a determination that the device has moved within the network after the delivering of the first portion of the content to the device, a determination that the device has moved its geographical location after the delivering of the first portion of the content to the device, a determination that a network path between the first node and the device has changed after the delivering of the first portion of the content to the device, a determination that the second node is the optimal node in a plurality of network nodes for delivering the content to the device, or a determination that the second node is the geographically closest node in a plurality of network nodes for delivering the content to the device. These are merely examples, and more generally, the determination that the second portion of the content should be delivered to the device from the second node comprises a determination that the second node is preferable over the first node for delivering the second portion of the content to the device, and may also be preferable for delivering further portions of the content to the device.

In some examples, the first node determines that the second portion of the content should be delivered to the device from the second node by receiving, from a third node in the network, an indication that the second portion of the content and/or any further portions of the content should be delivered to the device from the second node. For example, the indication may be received from a Request Router, such as Request Router 108 or 216, or any other suitable node, such as a node in a 5G network, e.g. a Session Management Function (SMF). In some examples, the first node may, in response to receiving the request for the second portion of content, send a request to the Request Router to determine whether the first node should provide the second portion of the content, or whether the second portion should be provided by a different node (e.g. the second node). In response, the Request Router may determine that the second node is preferable for providing the second portion of content (and possibly further portions of content), and thus reply to the first node indicating such.

In some cases, the first node may send a query to the Request Router upon receipt of any request for a portion of content from the device (and also for example from other devices). The reply from the Request Router may indicate that the portion of content should be delivered to the device by the first node, in which case the first node delivers the portion as appropriate. Alternatively, the reply from the Request Router may indicate that the portion should be delivered from the second node, in which case the first node redirects the device to the second node. In some examples, the Request Router may not be queried upon receipt of every request for a portion from the device, and instead may be queried upon receipt of a certain number of requests for portions of content, after a predetermined period of time has elapsed after a previous query, and/or one or more other criteria.

In some examples, instructing the device to retrieve the content from the second network node comprises sending a redirection message to the device, wherein the redirection message indicates that the second portion of the content is located at or should be retrieved from the second node. For example, the redirection message comprises an HTTP Redirect message. In one example, the request for the second portion may comprise a HTTP GET request from the device specifying a URL of the second portion of the content. The HTTP Redirect message (e.g. with status code 301 Moved Permanently, 303 See Other or 307 Temporary Redirect) may instruct the device to request the second portion from the second node. The HTTP Redirect message may also in some examples cause the device to send future requests for additional portions of content (e.g. additional segments) to the second node.

Figure 5:
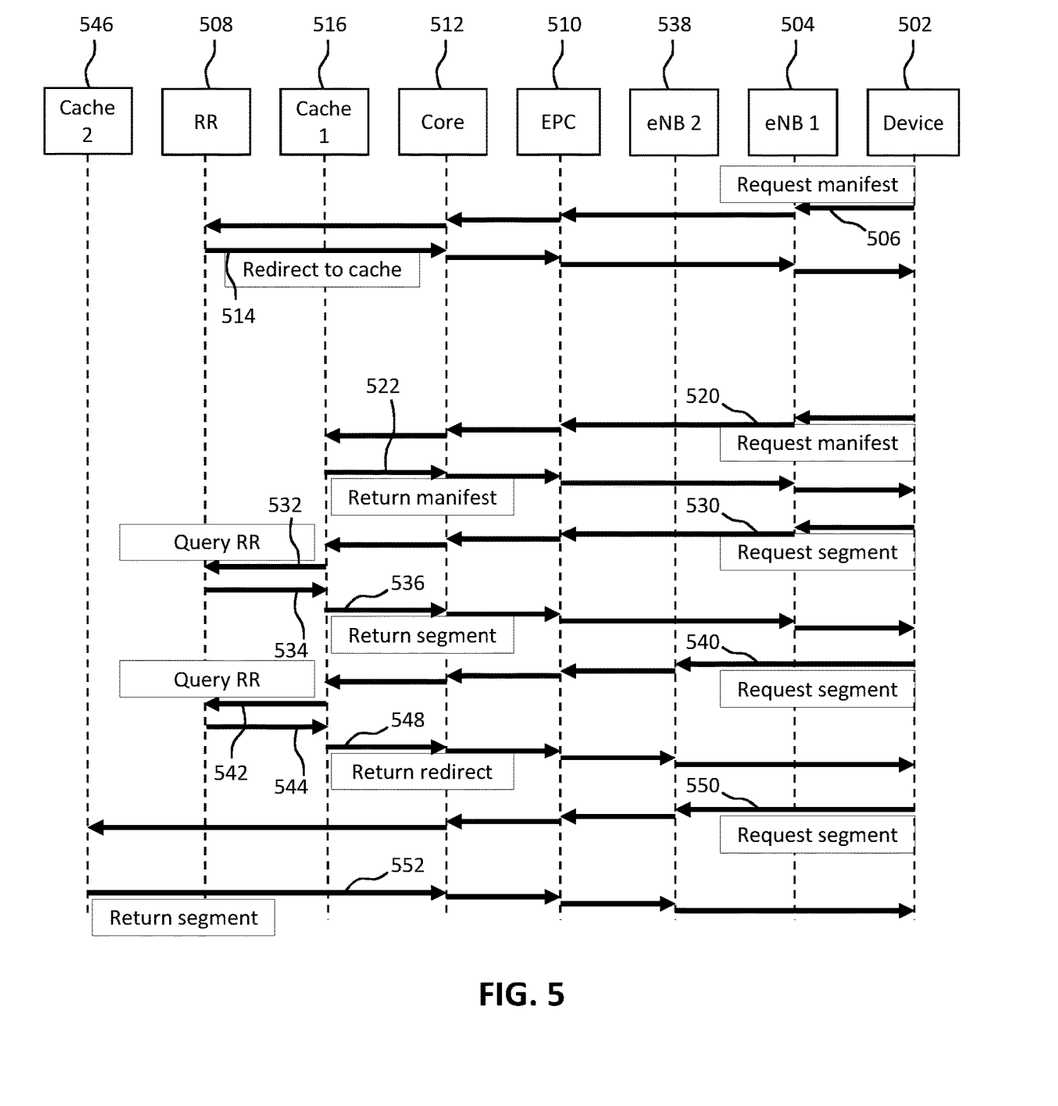
FIG. 5 is a schematic illustration of another example of communications in a communications system.

FIG. 5 shows an example of communications within a communications system according to some embodiments of this disclosure. In the communications system, a device 502 is connected to a first eNB 504. The device sends a request 506 for a content manifest to an IP address associated with a Request Router (RR) 508. The IP address may have previously been resolved using a DNS resolution process, such as that shown in FIG. 2 between device 202 and DNS server 212. The request 506 is propagated (e.g. forwarded or repeated) via first eNB 504, EPC 510 and core network 512. In response, the RR 508 returns a redirection 514 redirecting the device 502 to request the manifest from a first cache 516, which is determined (e.g. by the RR or another node) to be the preferable cache node for the device 502. The redirection 514 propagates via core network 512, EPC 510 and first eNB 504.

The device 502 then requests a first portion (e.g. segment) of content specified in the manifest by sending a request 520 to the first cache node 516. In this example, the request 520 propagates via first eNB 504, EPC 510 and core network 512, though in other examples and/or different network technologies, any of the communications shown in FIG. 5 may propagate through more or fewer nodes, and/or different types of nodes. In response to the request 520, the manifest 522 is returned by the first cache 516. Although not included in this example, the first cache 516 may, in response to the request 520 for the manifest, query the RR to determine whether the first cache 516 is the appropriate cache node for the device 502, and provide the manifest or redirect the device to retrieve the manifest (and also portions of the content) from another cache node as appropriate.

The device 502 then sends a request 530 for a segment of the content associated with the manifest to the first cache node 516. In response, the first cache node 516 sends a query 532 to the RR 508, and in reply the RR returns a response 534 to the first cache 516 indicating that the first cache 516 should deliver the requested segment. The first cache node 516 thus delivers the segment 536 to the device 502, via the appropriate nodes in the communications system, which in this example are the core network 512, EPC 510 and first eNB 504.

At this point, in this example, the device 502 changes connection status, which in this example is a handover from first eNB 504 to a second eNB 538. The device 502 then sends a request 540 for a segment of content to the first cache 516, via second eNB 538. The Second cache sends a query 542 508 to the RR and receives a response 544 indicating that a second cache node 546 should deliver the requested segment, as the RR has determined that due to the device's new connection status, the second cache node 546 is preferable over the first cache node 516 for delivering content to the device 502. The RR may determine this in any appropriate manner, for example by receiving a notification from the device or from a network node, from an IP address of the device, or any other suitable manner.

The first cache 516 thus sends a redirection instruction (e.g. HTTP Redirect) 548 to the device 502. As a result, the device 502 sends a request 550 for the same segment to the second cache node 546, and receives the segment 552 from the second cache node in return. Although not shown in this example, the second cache 546 may query the RR in response to the request 550 and/or any further requests from the device 502. In some examples, the device may, in response to the redirection instruction, first perform a DNS operation to resolve the IP address of the second cache node before sending the request to the second cache node.

It is noted that when the device 502 changes connection status, in some cases the same cache node may continue to provide content to the device if it is still the preferable cache node for the device. In other examples, the cache node for the device 502 may change based on factors other than connection status, such as for example availability or congestion of the cache node or another node in the network.

The network technologies represented in FIG. 5 are merely examples, and other network technologies such as 5G technologies may be used instead or in addition to those shown.

In some other examples, a cache node may not query the RR upon receiving a request for a portion of content from a device. Instead, the cache node may continue to supply segments to a device until it receives a notification, for example from a RR, that the cache node should instead redirect the device to another cache node. The node sending the notification (e.g. the RR) may determine when the appropriate cache node for the device has changed, and as a result send the notification to the cache node serving the device. The notification may also be sent to multiple cache nodes, for example where the node sending the notification does not know the cache node currently serving the device.

In some examples, a prediction engine may be used to predict when the preferable cache node for a device might change. For example, the prediction engine may determine when a device is likely to move locations and/or networks, using for example historic mobility of the device. Additionally or alternatively, the prediction engine may for example predict outage of network nodes, for example by predicting failures or receiving information regarding planned maintenance of network nodes, and/or may predict congestion of cache nodes and/or other network nodes. The prediction engine may use this information to determine that this would cause the preferred cache node for a device to change, and to pre-emptively cause a cache node to redirect a device to another cache node as a result.

Figure 6:
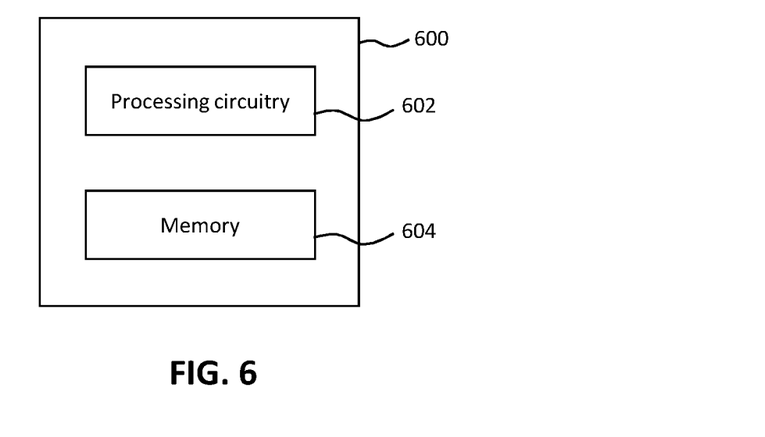
FIG. 6 is a schematic illustration of an example of apparatus for delivering content.

FIG. 6 shows an example of apparatus 600 according to embodiments of the disclosure. The apparatus 600 may be for example an apparatus for delivering content, such for example as a cache node in a network. The apparatus 600 may be configured to perform the method of FIG. 4 or any other example.

The apparatus 600 comprises processing circuitry 602 (e.g. a processor) and a memory 604 in communication with the processing circuitry 602. The memory 604 contains instructions executable by the processor 602. In one embodiment, the memory 604 contains instructions executable by the processor 602 such that the apparatus is operable to deliver a first portion of the content to a device, receive a request for a second portion of the content from the device and, responsive to the request and responsive to a determination that the second portion of the content should be delivered to the device from a second node in the network, instruct the device to retrieve the content from the second node. Thus, the apparatus may, for example, determine when the appropriate cache node for a device changes, and redirect the device to another cache node upon a request from the cache node for a portion of the content.

Figure 7:
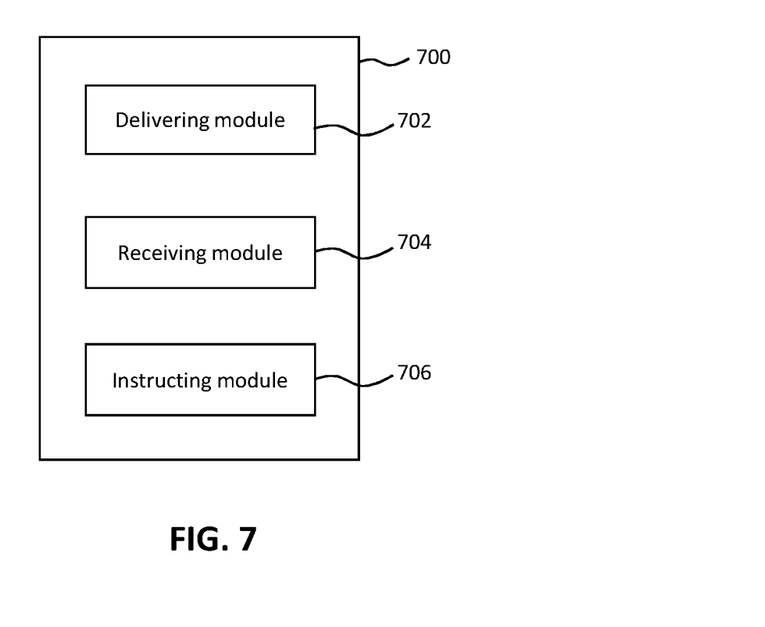
FIG. 7 is a schematic illustration of an example of another apparatus for delivering content.

FIG. 7 shows an example of an apparatus 700, for example for delivering content. The apparatus comprises a delivering module 702 configured to deliver a first portion of the content to a device, and a receiving module 704 configured to receive a request for a second portion of the content from the device. The apparatus 700 also comprises an instructing module 706 configured to instruct the device to retrieve the content from the second node in response to the request and in response to a determination that the second portion of the content should be delivered to the device from a second node in the network.

It should be noted that the above-mentioned examples illustrate rather than limit the invention, and that those skilled in the art will be able to design many alternative examples without departing from the scope of the appended statements. The word "comprising" does not exclude the presence of elements or steps other than those listed in a claim, "a" or "an" does not exclude a plurality, and a single processor or other unit may fulfil the functions of several units recited in the statements below. Where the terms, "first", "second" etc. are used they are to be understood merely as labels for the convenient identification of a particular feature. In particular, they are not to be interpreted as describing the first or the second feature of a plurality of such features (i.e. the first or second of such features to occur in time or space) unless explicitly stated otherwise. Steps in the methods disclosed herein may be carried out in any order unless expressly otherwise stated. Any reference signs in the statements shall not be construed so as to limit their scope.

The invention claimed is:

1. A method in a first node in a network of delivering content, comprising:
   delivering a first portion of the content to a device;
   receiving a request for a second portion of the content from the device; and
   responsive to the request and responsive to a determination that the second portion of the content should be delivered to the device from a second node in the network, instructing the device to retrieve the content from the second node by sending a redirection message to the device that indicates that the second portion of the content is located at the second node;
   wherein the determination that the second portion of the content should be delivered to the device from the second node comprises at least one determination from among the following determinations:
      a determination that the device has moved within the network after the delivering of the first portion of the content to the device;
      a determination that the device has moved its geographical location after the delivering of the first portion of the content to the device;
      a determination that a network path between the first node and the device has changed after the delivering of the first portion of the content to the device;
      a determination that the second node is the optimal node in a plurality of network nodes for delivering the content to the device; and
      a determination that the second node is the geographically closest node in a plurality of network nodes for delivering the content to the device.

2. The method of claim 1, comprising determining that the second portion of the content should be delivered to the device from the second node.

3. The method of claim 2, wherein determining that the second portion of the content should be delivered to the device from the second node comprises receiving, from a third node in the network, an indication that the second portion of the content and/or any further portions of the content should be delivered to the device from the second node.

4. The method of claim 1, wherein the redirection message comprises an HTTP Redirect message.

5. The method of claim 4, wherein the request for the second portion of the content comprises an HTTP Get request.

6. The method of claim 1, comprising receiving a request for the first portion of the content, wherein delivering the first portion of the content to a device comprises delivering the first portion of the content in response to the request for the first portion of the content.

7. The method of claim 6, wherein delivering the first portion of the content to a device comprises delivering the first portion of the content in response to a determination that the first portion of the content should be delivered to the device from the first node.

8. The method of claim 7, wherein the determination that the first portion of the content should be delivered to the device from the first node comprises a determination that the device has not moved within the network after delivering a portion of the content earlier than the first portion to the device, a determination that the device has not moved its geographical location after delivering a portion of the content earlier than the first portion to the device, a determination that a network path between the first node and the device has not changed after delivering a portion of the content earlier than the first portion to the device, a determination that the first node is the optimal node in a plurality of network nodes for delivering the content to the device, or a determination that the first node is the geographically closest node in a plurality of network nodes for delivering the content to the device.

9. The method of claim 1, wherein the first and second portions of the content are specified in a manifest file for the content.

10. The method of claim 1, wherein the content comprises a video.

11. The method of claim 1, wherein the first node comprises a network cache node.

12. An apparatus for delivering content, the apparatus comprising a processor and a memory, the memory containing instructions executable by the processor such that the apparatus is operable to:

deliver a first portion of the content to a device;

receive a request for a second portion of the content from the device; and responsive to the request and responsive to a determination that the second portion of the content should be delivered to the device from a second node in the network, instruct the device to retrieve the content from the second node by sending a redirection message to the device that indicates that the second portion of the content is located at the second node;

wherein the determination that the second portion of the content should be delivered to the device from the second node comprises at least one determination from among the following determinations:

a determination that the device has moved within the network after the delivering of the first portion of the content to the device;

a determination that the device has moved its geographical location after the delivering of the first portion of the content to the device;

a determination that a network path between the first node and the device has changed after the delivering of the first portion of the content to the device;

a determination that the second node is the optimal node in a plurality of network nodes for delivering the content to the device; and a determination that the second node is the geographically closest node in a plurality of network nodes for delivering the content to the device.

13. The apparatus of claim 12, wherein the memory contains instructions executable by the processor such that the apparatus is further operable to determine that the second portion of the content should be delivered to the device from the second node.

14. The apparatus of claim 13, wherein the memory contains instructions executable by the processor such that the apparatus, operable to determine that the second portion of the content should be delivered to the device from the second node, is further operable to receive, from a third node in the network, an indication that the second portion of the content and/or any further portions of the content should be delivered to the device from the second node.

15. The apparatus of claim 12, wherein the redirection message comprises an HTTP Redirect message.

16. The apparatus of claim 12, wherein the request for the second portion of the content comprises an HTTP Get request.

17. The apparatus of claim 12, wherein the memory contains instructions executable by the processor such that the apparatus is further operable to receive a request for the first portion of the content, wherein delivering the first portion of the content to a device comprises delivering the first portion of the content in response to the request for the first portion of the content.

18. The apparatus of claim 17, wherein the memory contains instructions executable by the processor such that the apparatus, operable to deliver the first portion of the content to a device, is further operable to deliver the first portion of the content in response to a determination that the first portion of the content should be delivered to the device from the first node.

19. The apparatus of claim 12, wherein the first and second portions of the content are specified in a manifest file for the content.

20. The apparatus of claim 12, wherein the first node comprises a network cache node.

\* \* \* \* \*